L. S. BARR.
AIRPLANE SIGNAL.
APPLICATION FILED MAY 10, 1919.
1,324,784.
Patented Dec. 16, 1919.
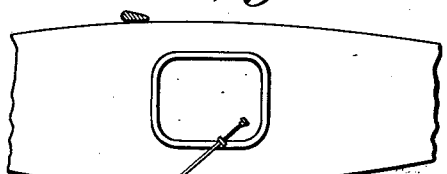
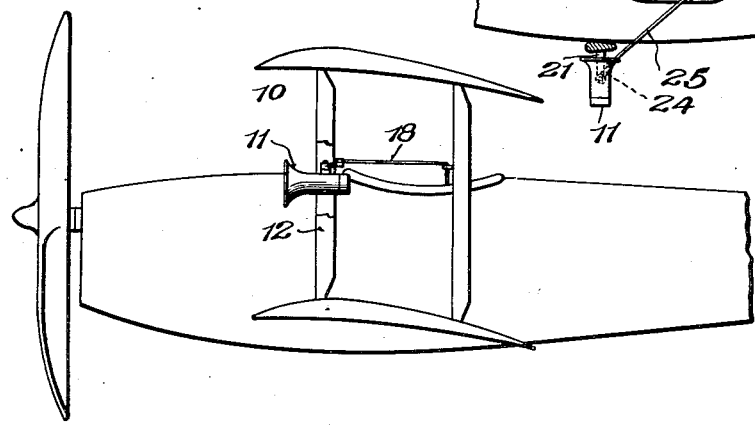
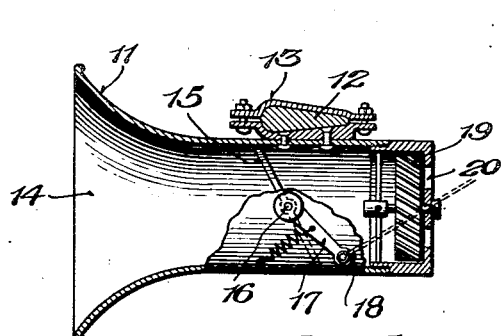
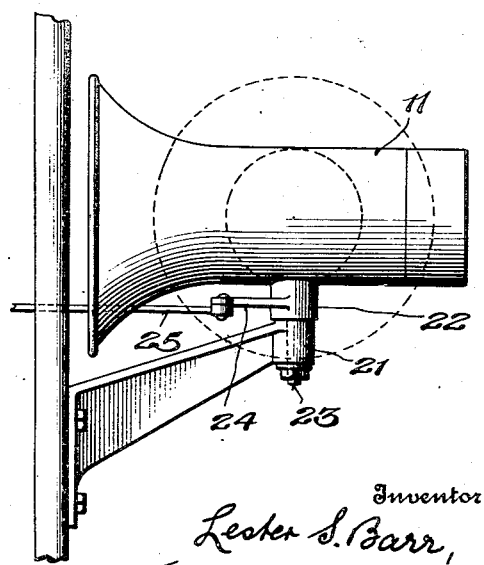
Inventor
Lester S. Barr,
By Foster, Freeman, Watson & Coit,
Attorneys
Witness
Chas. L. Griesbauer

UNITED STATES PATENT OFFICE.

LESTER S. BARR, OF WASHINGTON, DISTRICT OF COLUMBIA.

AIRPLANE-SIGNAL.

1,324,784.　　　　　　Specification of Letters Patent.　　Patented Dec. 16, 1919.

Application filed May 10, 1919. Serial No. 296,149.

*To all whom it may concern:*

Be it known that I, LESTER S. BARR, a citizen of the United States, and residing at Washington, District of Columbia, have invented certain new and useful Improvements in Airplane-Signals, of which the following is a specification.

The present invention relates to airplanes and more particularly to a warning signal associated therewith. Usually when an airplane descends to make a landing the pilot shuts off the engine so that the flight of the airplane is noiseless, with the exception of the sound produced by the friction of the air on the wires and body. Consequently, it gives no warning of its descent to persons who may be on the landing field. It is the principal object of the present invention to provide a signal to give a warning when an airplane is landing, and more particularly to provide a signal under the control of the pilot adapted to be actuated by the wind produced by the movement of the plane. Other objects and features of novelty will be apparent from the description taken in connection with the drawings in which:

Figure 1 is a partial side elevation of an airplane provided with a warning signal in accordance with the present invention;

Fig. 2 is a plan view mostly in section of a warning signal illustrating the manner of controlling the same and of securing it to the plane;

Fig. 3 is a front elevation of another form of the invention in which the signal is pivoted and controlled by swinging it to bring its mouth into the direction of flight or at right angles thereto;

Fig. 4 is a partial plan view of a plane further illustrating the manner of mounting shown in Fig. 3; and Fig. 5 is a sectional elevation through a fuselage of an airplane illustrating another method of mounting the signal, eliminating the head resistance of the horn when not in use.

Referring to the drawings the numeral 10 indicates an airplane having a warning signal 11 associated therewith. As shown in Fig. 2 this signal may be secured to one of the struts 12 of the plane by means of the clamp 13. The signal shown in Fig. 2 is of the siren type. The flow of air into the mouth 14 and through the signal is controlled by a valve such as indicated at 15. This valve is adapted to be controlled by the pilot in any suitable manner. As shown its stem 16 is provided with an arm 17 having a member 18 secured to the free end thereof and extending to the point adjacent the pilot in the fuselage of the plane. The air passing by this valve impinges on the blades 19 of an air motor and thereby effects the rotation thereof. The air discharged from these blades passes through a series of apertures 20 formed in a rear wall of the warning signal. It is to be understood that other types of warning signals may be used, the invention not being limited to the siren type. Obviously, the air motor might be associated with other forms of signals so as to operate the same.

In Figs. 3 and 4 the signal 11 is pivotally mounted on a support 21. For this purpose the signal has a boss 22 and a pivot pin 23 extends through the bracket into said boss. Any suitable mechanism may be provided for turning the signal on the pivot pin. As shown the boss 22 has an arm 24 the free end of which is connected to a member 25 extending to a point adjacent the pilot. In the operation of this form of the invention the pilot actuates the member 25 so as to swing the signal to bring its mouth into the wind caused by the flight, the flow of air through the signal thus operating the same. By swinging the signal so that its axis is perpendicular to the direction of flight there will be no flow of air through the same and the signal will thus be rendered inoperative.

In the form of the invention illustrated in Fig. 5 the signal 11 is mounted on a pivot 26 within the fuselage of the airplane and is adapted to be moved out through an aperture 27 formed in the side thereof. For this purpose a handle or arm 28 may be provided. When the signal is disposed within the fuselage as indicated in full lines in Fig. 5 it will not be operated and will not afford resistance to the air and will be flush with aperture in fuselage. When it is desired to sound the same, however, the arm 28 is moved downwardly, or string pulled or any other means of operating, thus projecting the horn through the aperture 27 so that air may flow through and operate the same.

Although the invention has been described in detail it is to be understood that 110 it is not limited to the forms shown but includes modifications and changes which come within the scope of the appended claims.

Having thus described the invention what is claimed as new and desired to be secured by Letters Patent is:

1. The combination with an airplane, of a warning signal associated therewith adapted to be operated by the wind produced by movement of the plane relative to the air, and means to control the operation of the signal.

2. The combination with an airplane, of a warning signal associated therewith including an air motor operated by the wind produced by the movement of the plane relative to the air, and means to regulate the flow of air through said motor, thereby controlling the operation of the signal.

In testimony whereof I affix my signature.

LESTER S. BARR.